US010686657B2

(12) United States Patent
Perez

(10) Patent No.: US 10,686,657 B2
(45) Date of Patent: Jun. 16, 2020

(54) AUTOMATIC PROVISIONING OF CUSTOMER PREMISES EQUIPMENT

(71) Applicant: Nettune Communications, LLC, Mesa, AZ (US)

(72) Inventor: Daniel Xavier Perez, Mesa, AZ (US)

(73) Assignee: XFACTOR NETWORKS, LLC, Mesa, AZ (US)

( * ) Notice: Subject to any disclaimer, the term of this patent is extended or adjusted under 35 U.S.C. 154(b) by 0 days.

(21) Appl. No.: 16/141,852

(22) Filed: Sep. 25, 2018

(65) Prior Publication Data

US 2019/0199588 A1     Jun. 27, 2019

Related U.S. Application Data

(63) Continuation of application No. 15/222,198, filed on Jul. 28, 2016, now abandoned.

(51) Int. Cl.
*H04L 12/24* (2006.01)

(52) U.S. Cl.
CPC ...... *H04L 41/0809* (2013.01); *H04L 41/0886* (2013.01)

(58) Field of Classification Search
None
See application file for complete search history.

(56) References Cited

U.S. PATENT DOCUMENTS

| 7,197,550 | B2 | 3/2007 | Cheline et al. | |
|---|---|---|---|---|
| 2002/0044567 | A1 | 4/2002 | Voit | |
| 2002/0147833 | A1 | 10/2002 | Richardson | |
| 2006/0050862 | A1* | 3/2006 | Shen | H04L 12/2856 379/219 |
| 2007/0127506 | A1 | 6/2007 | Absillis | |
| 2007/0297396 | A1 | 12/2007 | Eldar | |
| 2008/0147840 | A1* | 6/2008 | Roelens | H04L 41/0803 709/223 |
| 2010/0202441 | A1* | 8/2010 | Haag | H04L 12/287 370/352 |
| 2013/0268578 | A1 | 10/2013 | Bose | |
| 2014/0122674 | A1 | 5/2014 | Gray et al. | |
| 2016/0315808 | A1 | 10/2016 | Saavedra | |

* cited by examiner

*Primary Examiner* — Scott B Christensen
(74) *Attorney, Agent, or Firm* — Booth Udall Fuller, PLC

(57) ABSTRACT

Systems, methods, apparatus and other mechanisms to automatically provision CPE at a customer location by generating and storing at a server a "gold" configuration script for each CPE for each customer, and for downloading the gold configuration script to CPE in response to receiving at a zero touch provisioning (ZTP) entity a provisioning control signal automatically generated by CPE due to execution of a pre-installed script upon initial power up. The gold configuration script may comprise CPE configuration and service provisioning information received from the ZTP entity, such as provided by a class of service (COS) template specifically designed to provision the requesting CPE in accordance with the premises-specific environment of the network and the customer-specific services to be provided via the network.

20 Claims, 4 Drawing Sheets

AUTOMATIC PROVISIONING OF CUSTOMER PREMISES EQUIPMENT

CROSS-REFERENCE TO RELATED APPLICATION

The present application claims priority to and is a Continuation of U.S. patent application Ser. No. 15/222,198 filed Jul. 28, 2016, which is hereby incorporated by reference in its entirety.

TECHNICAL FIELD

The disclosure relates to communications systems and, more particularly but not exclusively, to automatically provisioning customer premises equipment (CPE).

BACKGROUND

Services such as voice, data, streaming video and other services are often provided to home and business customers/subscribers by telecom service providers, multichannel video programming distributors (MVPD) and so on. Customer premises equipment (CPE) may include various types of terminal equipment to process received MVPD signals to thereby enable subscribers to view, record, and interact with the services. Among the more common consumer electronics devices are television sets, set-top boxes, cable modems and personal video recorders. The CPE cooperates with an access network of the service provider to receive appropriate services thereby.

Traditionally, setting up CPE for customer involves a technician installing the CPE at the customer location, provisioning the CPE directly or by cooperating with service provider personnel at a service network management location, and testing the CPE to ensure that it works for its intended purpose, such as a set-top box (STB) and modem for customer receiving television, telecom and data services at home. The traditional CPE provisioning process is therefore time-consuming and expensive.

Automatic provisioning of CPE is desired to streamline the CPE provisioning process and reduce costs. Existing automatic provisioning techniques are based upon techniques developed for use in provisioning over telephones within the context of a 3G/4G mobile network environment. However, the 3G/4G network environment for provisioning mobile telephones is the same everywhere in the mobile network, whereas the service provider network environment for provisioning a CPE is not only subject to significant differences depending upon location, there are also many more parameters to provision relevant CPE in such a network. That is, automatic provisioning of CPE within a service provider network requires the provisioning of many operating parameters, provisioning of operating parameters of enormous complexity as compared to mobile telephones, and the provisioning of these parameters within the context of local network conditions which may vary considerably and unexpectedly between locales.

SUMMARY

Various deficiencies in the prior art are addressed by systems, methods, apparatus and other mechanisms to automatically provision CPE at a customer location by generating and storing at a server a "gold" configuration script for each CPE for each customer, and for downloading that script to CPE in response to receiving at a zero touch provisioning (ZTP) entity a provisioning control signal automatically generated by CPE due to execution of a pre-installed script upon initial power up. The gold configuration script may comprise CPE configuration and service provisioning information received from the ZTP entity, such as provided by a class of service (COS) template specifically designed to provision the requesting CPE in accordance with the premises-specific environment of the network and the customer-specific services to be provided via the network.

One embodiment comprises a method, performed by a server computing device for zero touch provisioning (ZTP) in a network, the method comprising: receiving a customer specification of network requirements (CSNR) exclusively specified for a customer premises equipment (CPE); provisioning a class of service (COS) template exclusively created for providing an intended operation of the CPE based at least on the CSNR; storing the COS template and an identity of the CPE as one job assignment; receiving, from the CPE, a signal comprising the identity of the CPE being plugged into a network link at customer premises for a first time; and downloading to the CPE, based at least on the received identity of the CPE matching the one job assignment, service information for the ZTP of the intended operation of the CPE, the service information including at least the COS template information.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

According to various embodiments described herein, methods, apparatus and software related products (e.g., a computer readable memory or a storage device) are presented for enabling and otherwise providing for the automatic or "zero touch" provisioning of Customer Premises Equipment (CPE). While the invention will be primarily described within the context of automatic provisioning of CPE within a MVPD delivery network, it will be appreciated by those skilled in the art that the teachings of the various embodiments are also applicable to other broadband services delivery networks.

Figure 1:
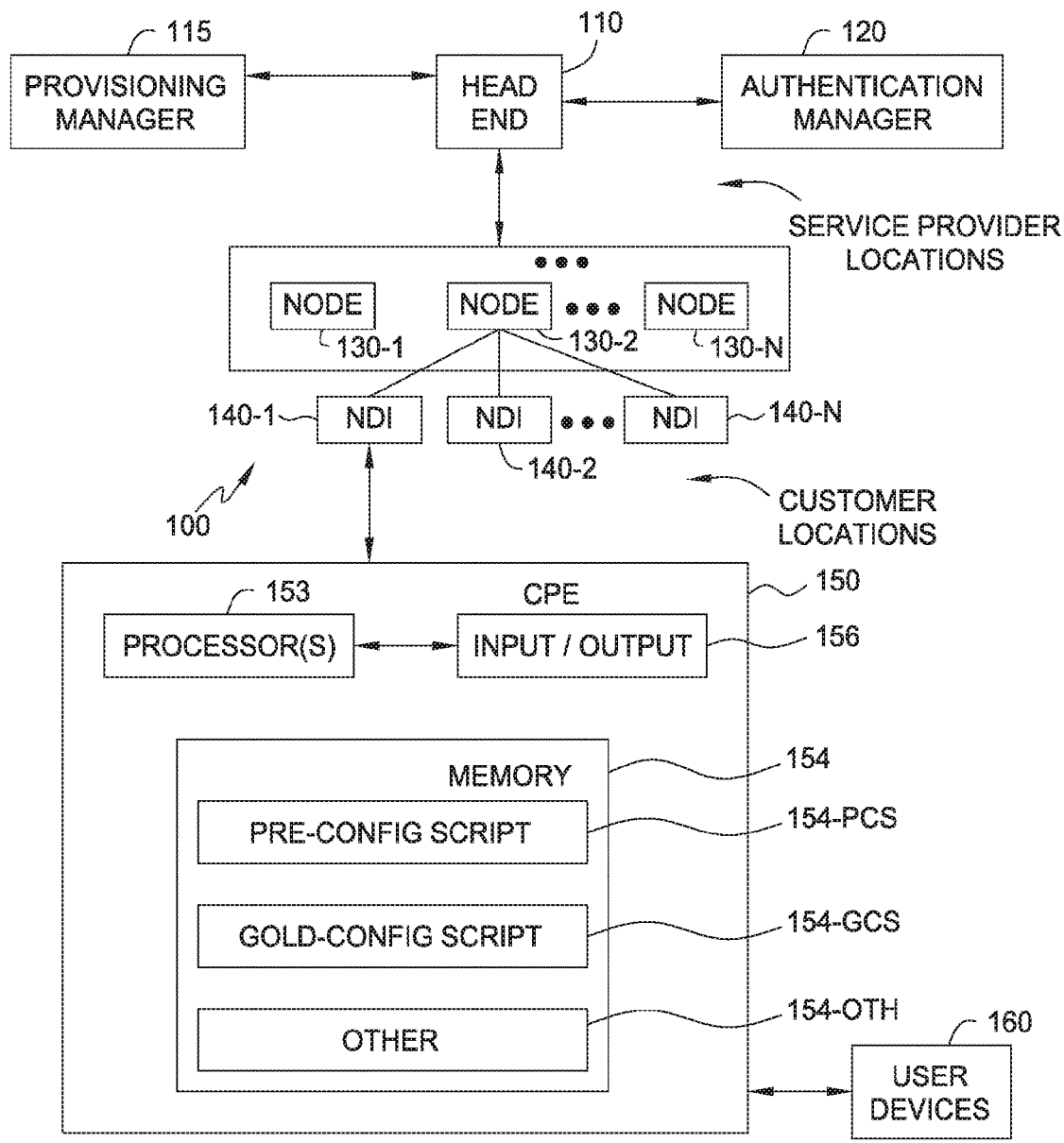
FIG. 1 depicts a high-level block diagram of a system according to one embodiment.

FIG. 1 is a block diagram of a simplified system useful in illustrating the provisioning of Customer Premises Equipment (CPE) according to various embodiments. That is, FIG. 1 depicts a simplified block diagram of a broadband services delivery network benefiting from the various embodiments. Specifically, the broadband services delivery network 100 of FIG. 1 as depicted comprises a MVPD distribution/delivery network, though other types of distribution/delivery networks may benefit from the various embodiments.

The broadband services delivery network 100 comprises, illustratively, a head end 110 adapted to communicate with a provisioning manager or server 115, an authentication manager or server 120 and a plurality of provider edge routers 130-1 through 130-N (collectively provider edge routers 130).

The head end 110 may comprise a cable television head end or network server operative to provide broadband services to subscribers/customers, manage subscriber/customer sessions, propagate content toward subscribers/customers, interact with subscriber/customer CPE and the like. The head end 110 may also provide various session management functions associated with the services instantiated by or on behalf of various subscribers or customers of the service provider. Session management functions generally include sending data to CPE such as commands, encryption keys and the like, receiving data from CPE such as information stream requests, session initiation data (set-top identification, authorization information etc.), user interaction information and the like.

Each of the edge routers 130 is adapted to communicate with a respective group of subscribers/customers via respective CPE located at the subscriber/customer house, office or other location. Subscriber/customer CPE may comprise, illustratively, modems or network interface devices 140, set top boxes (STBs) 150 and other types of CPE such as wireless access points (WAPs) and the like as will be appreciated by those skilled in the art. Further, various user devices 155 may communicate with the service provider network via the CPE, such as wireless or wireline routers (not shown) connected via the modem 140, mobile devices connected via a wireless access point (WAP) in communication with the modem 140 and so on.

FIG. 1 also depicts an illustrative customer location such as a house or business address having a Network Interface Device (NID) or modem communicating with provider network via edge node 130-2, and communicating with CPE 150. CPE 150 is depicted as comprising computing apparatus including one or more processors 153, memory 154 and input/output circuitry 156. The memory is further depicted as including a pre-configuration script 154-PCS, a gold configuration script 154-GCS, and other programming 154-OTH.

The pre-configuration script 154-PCS may be stored in memory 154 at time of CPE manufacturer, or received from local modem 140 in response to powering on CPE 150 for the first time while connected to local modem 140. Generally speaking, the pre-configuration script 154-PCS is invoked at initial power up (or CPE refresh) to provide thereby default information such as enabling the CPE to automatically interact with a remote Zero Touch Provisioning (ZTP) entity (e.g., provisioning manager or server 115) to request CPE configuration and service provisioning information therefrom, such as by automatically transmitting CPE identification information to one or more stored ZTP server addresses. The gold-configuration script 154-GCS comprises CPE configuration and service provisioning information received from the ZTP entity, such as provided by a class of service (COS) template specifically designed to provision the CPE 150 in accordance with the premises-specific environment of the network and the customer-specific services to be provided via the network. The various scripts and other programming will be described more detail below.

Referring to FIG. 1, provider edge router 130-2 is depicted as communicating with a group of network interface devices (NIDs) 140-1 through 140-N (collectively network interface devices 140). However, in various embodiments where the NID 140 is not necessary to connect the node 130 and subscriber/customer CPE, the node 130 and subscriber/customer CPE is connected directly to the communications network via some other link or interface mechanism.

The authentication manager or server 120 comprises a management entity adapted to implement various CPE authorization mechanisms to ensure that CPE accessing the provider network are authorized to do so. The authentication manager 120 may be implemented as a standalone entity interacting with CPE via the head end 110, via the edge router 130 or via some other network entity in direct or indirect communication with CPE to be authorized. In various embodiments, the authentication manager 120 is included as a module or element within the head end 110 and/or edge router 130. The authentication manager 120 may be implemented within, or interact with, one or more of the edge router 130 to provide a CPE authorization mechanism for respective groups of subscribers/customers.

The provisioning manager or server 115 comprises a management entity adapted to implement various CPE provisioning mechanisms to ensure that newly installed, updated or refreshed CPE, as well as any other network elements supporting CPE access to the network and network services, are appropriately provisioned to enable CPE access to the provider network and to the relevant services associated with the CPE. Various operations associated with the provisioning manager 115 will be described in more detail below with respect to FIGS. 2-3.

The provisioning manager 115 may be implemented as a standalone entity interacting with CPE via the head end 110, via the edge router 130 or via some other network entity in direct or indirect communication with CPE to be provisioned. In various embodiments, the provisioning manager 115 is included as a module or element within the head end 110 and/or edge router 130. The provisioning manager 115 may be implemented within, or interact with, one or more of the edge router 130 to provide a CPE provisioning mechanism for respective groups of subscriber/customer CPE. This automated CPE provisioning mechanism comprises a Zero Touch Provisioning (ZTP) in that field installation/service personnel are typically not needed to install CPE at customer locations.

It is noted that the various elements described herein with respect to the service provider entities as well as customer entities may be implemented using computing apparatus such as described below with respect to FIG. 4. That is, the various elements such as the head end 110, authentication manager 120, provisioning manager or server 115, edge routers 130, network interface devices or modems 140, customer premises equipment 150 may be implemented in whole or in part using computing apparatus such as described below with respect to FIG. 4.

Generally speaking, CPE provisioning comprises configuring the CPE itself as well as configuring various services, protocols, function and the like as needed to support the services to be used by the CPE, such as Dynamic Host Configuration Protocol (DHCP) pool of address that the CPE should use, the particular Internet Protocol (IP) address to be used by the CPE, and Virtual Local Area Network (VLAN) to which the CPE should belong, the Quality of Service (QoS) parameters associated with the relevant services, and so on. These parameters must be configured in accordance with the customer's specific network environment. Further, after initial authentication of CPE to the provider network, additional provisioning steps may be required such as identifying the CPE Media Access Control (MAC) address and so on. Various embodiments contemplate authentication of the CPE after provisioning of the CPE via the ZTP server.

Various embodiments contemplate providing to each CPE to be configured a pre-configured script as part of a CPE discovery agent instantiated within the CPE when powered up. The pre-configured script may comprise a standard of "gold" script included within the CPE during manufacture, or included within the CPE prior to sending the CPE to a customer location for installation.

Various embodiments contemplate that CPE 150 such as a router includes an Ethernet interface with DHCP IP enabled so that the CPE 150 calls out for a dynamic IP address via the modem 150 (e.g., CPE 150 connected to MTA Ethernet output of modem 140).

Various embodiments contemplate providing to each CPE to be configured a respective configuration template as part of a CPE deployed agent instantiated within the CPE after power up, such as after an initial discovery process has been performed (e.g., according to the discovery agent pre-configured script). The respective configuration template may be sent by the provisioning manager or server 115 to the CPE 150 as a file using file transfer protocol (ftp), as a network message or via some other format or delivery mechanism.

Various provider equipment or entities cooperate to implement the CPE provisioning mechanisms of the various embodiments. For example, in one embodiment the following entities perform the following functions to implement thereby a system or mechanism for receiving and distributing to CPE templates that configure/provision the CPE in an appropriate manner. In this example, it is assumed that CPE is to be delivered to a customer's location where the customer will simply connect the power and network cables and power up the modem and CPE, which will then be configured and provisioned.

Figure 2:
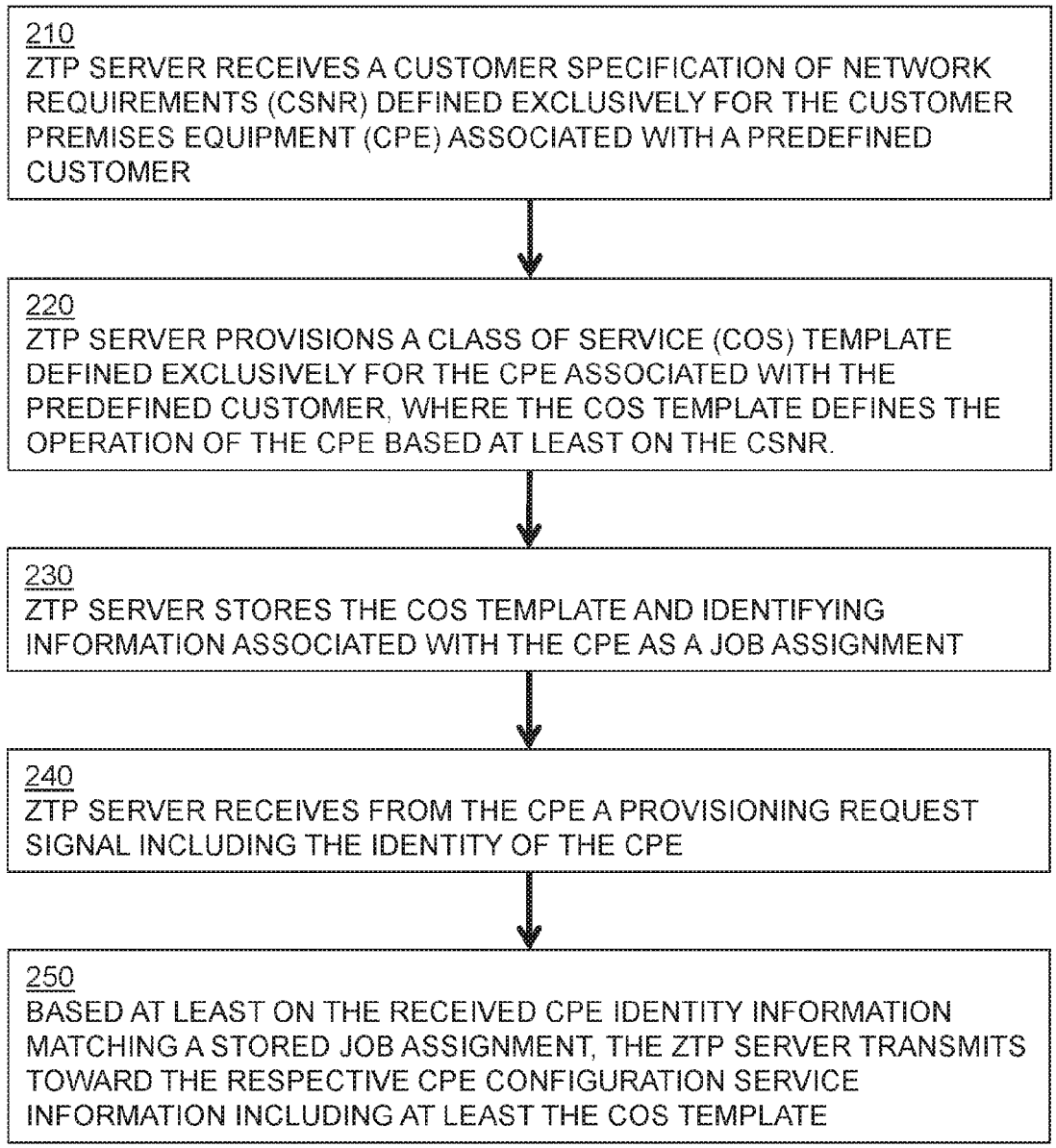
FIGS. 2 and 3 depict a flow diagrams of methods according to various embodiments.

FIG. 2 depicts a method 200 for staging and deploying class of service (COS) templates suitable for use in a ZTP server, such as the provisioning manager for server 115 discussed above with respect to FIG. 1.

At step 210, the ZTP server receives a customer specification of network requirements (CSNR) defined exclusively for the customer premises equipment (CPE) associated with a predefined customer. For example, a CSNR may be specified for a CPE device to be delivered to a customer home or business, such as a set-top box (STB), a CPE router, a CPE switch, a voice over Internet protocol (VoIP) device or other CPE device. The location of the customer home or business (i.e., the customer location) is known, the network topology associated with the neighborhood is known, the initial services to be provided to the customer is known.

At step 220, the ZTP server provisions a class of service (COS) template defined exclusively for the CPE associated with the predefined customer, where the COS template defines the operation of the CPE based at least on the CSNR. In various embodiments, the class of service (COS) template comprises service configuration layer information, such as information indicating at least one of voice quality and a voice session initiation protocol (SIP) trunking.

At step 230, the ZTP server stores the COS template and identifying information associated with the CPE as a job assignment. In various embodiments, the job assignment comprises one of a plurality of job assignment entries in a table of job assignments for a corresponding plurality of CPEs. The table may be stored in the ZTP server or some other management entity.

At step 240, the ZTP server receives from the CPE a provisioning request signal including the identity of the CPE upon the CPE being plugged into a network link at the customer premises for the first time. In various other embodiments, the CPE signal including the identity of the CPE may be transmitted by the CPE in response to a remotely generated refresh signal, a locally generated refresh signal and the like.

In various embodiments, the identity of the CPE is based upon a manufacturer serial number or other serial number associated with the CPE. In various embodiments, the ZTP server is identified by an auto link within the CPE upon CPE power up the first time (or refresh). The auto link may comprise a fully qualified domain name (FQDN) associated with the ZTP server or some other resource locator or identifier. In various embodiments, the CPE may be identified via a Media Access Control (MAC) address.

In various embodiments, a communication path between the ZTP server and the CPE includes a modem installed in the customer premises at configured to communicate with an access network of the service provider.

At step 250, based at least on the received CPE identity information matching a stored job assignment, the ZTP server transmits toward the respective CPE service information including at least the COS template information associated with the stored job assignment.

In various embodiments, the COS template information is not transmitted toward the respective CPE until the respective CPE is authenticated. In various embodiments, the service information may comprise service attribute information such as a point-to-point protocol (PPP) information, local area network (LAN) information, Quality of Service (QoS) information, Dynamic Host Configuration Protocol (DHCP) information, Virtual Local Area Network (VLAN) and the like.

Figure 3:
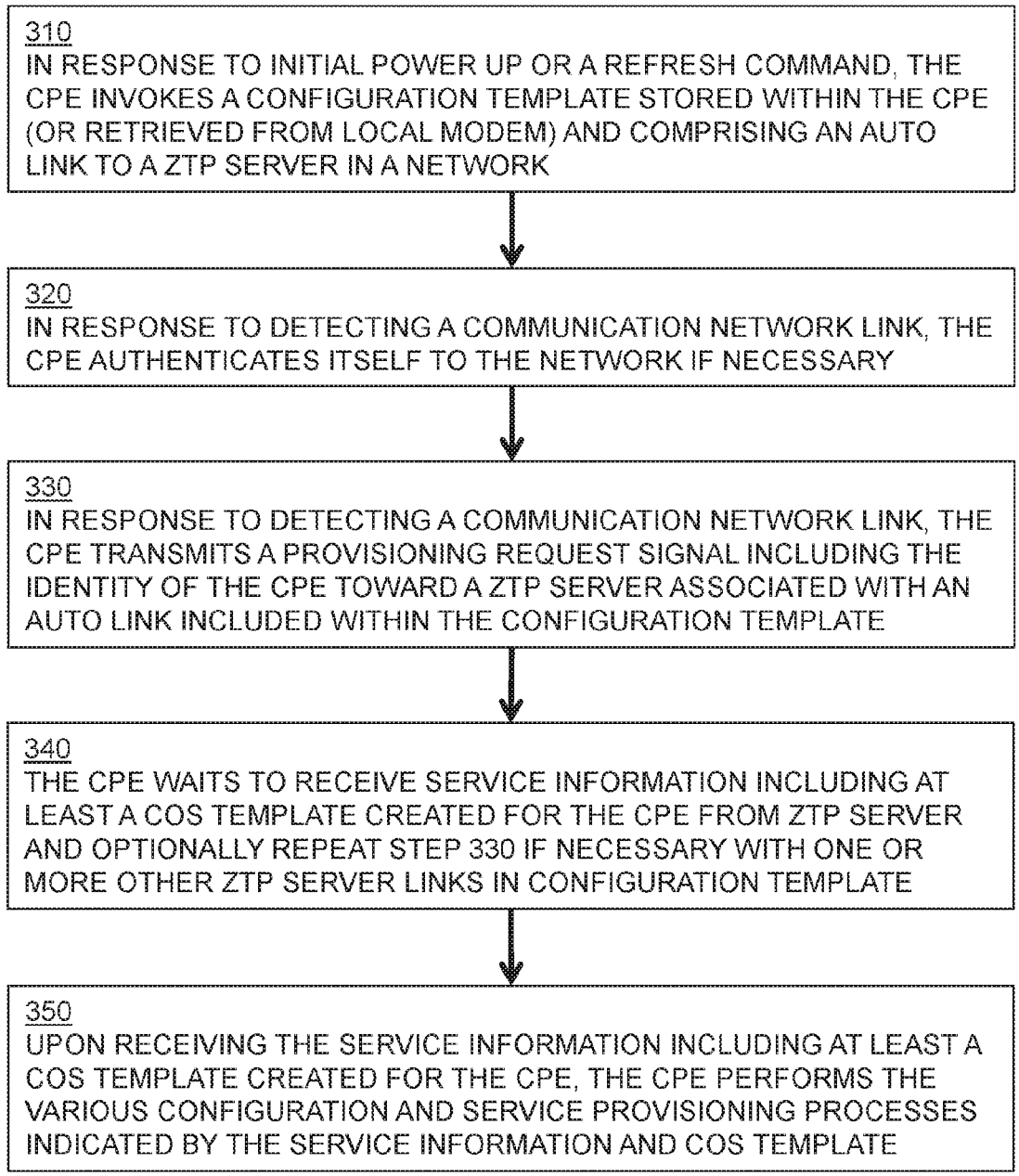

FIG. 3 depicts a method 300 for zero touch provisioning invoked at a CPE to retrieve and implement configuration and service information such as provided via a COS template requested by the CPE and received from the ZTP upon CPE initial power up or refresh.

At step 310, in response to initial power up or a refresh command, the CPE invokes a configuration template stored within the CPE and comprising an auto link to a ZTP server in a network, the auto link being indicative of the and the like. Identity/address of the ZTP server and the CPE. In various embodiments, the configuration template is included within the CPE by the manufacturer of the CPE. In various embodiments, the configuration template is communicated to the CPE by a modem or other device associated with the service provider and local to the CPE. That is, the CPE may receive an initial configuration template or a replacement configuration template from a modem at the customer location.

At step 320, in response to detecting the presence of a communication network link, the CPE authenticate itself to the network if necessary. For example, if the CPE is connected and powered on for the first time at a customer location, prior to receiving network services above the minimum necessary to provide authentication, the CPE must be authenticated as authorized for receiving such network services. Generally speaking, the CPE will communicate identification information such as an identification number, MAC address and the like to an authentication manager such as authentication manager 120. If the authentication manager determines that the CPE is authorized to access network services, then the authentication manager will communicate such authorization/authentication to other management entities such as head end 110, provisioning manager or server 115 and the like.

Various embodiments contemplate authentication of the CPE after provisioning of the CPE via the ZTP server. In these embodiments, the functions of step 320 may instead be performed after some or all of the following steps have been completed.

At step 330, in response to detecting the presence of a communication network link, the CPE transmits a provisioning request signal including the identity of the CPE toward a ZTP server associated with an auto link included within the configuration template. The auto link comprises an IP address or Uniform Resource Locator (URL) associated with a ZTP server. In various embodiments, the auto link to the ZTP server comprises a fully qualified domain name (FQDN) of the ZTP server.

In various embodiments, the communication network link between the communication network and the CPE may be provided in any standard manner such as via a coaxial cable, a twisted pair, an optical fiber a network cable (e.g., ETHERNET) and the like. The communication network link may be directly to the communication network or via a modem at the customer location.

At step 340, the CPE waits to receive service information including at least a COS template created for the CPE from the ZTP server. Optionally, in various embodiments multiple links to ZTP servers are provided within the configuration template to enable the CPE to transmit a provisioning request signal to one or more other ZTP servers if needed (e.g., initial or subsequent ZTP server does not respond within a predefined time period). That is, in various embodiments step 330 may be repeated as necessary if an initial or subsequent ZTP server is not reachable by the CPE.

At step 350, upon receiving the service information including at least a COS template created for the CPE, the CPE performs the various configuration and service provisioning processes indicated by the service information and COS template such that the CPE is properly configured for operation with the service provider network and properly configured for delivering the appropriate network services to the customer.

Thus, the method 300 provides a mechanism which a CPE requests and receives service information (including at least a COS template) which was generated specifically for that customer CPE device in accordance with a customer specification of network requirements (CSNR).in this manner, the customer only needs to plug the CPE into the local modem and the CPE will configure itself and those services appropriate to the customer.

In various embodiments, the provisioning manager or server 115 or ZTP server stages pre-provisioned Configuration of Service (COS) templates that may be allocated to assigned CPE serial numbers associated with specific customers, or may comprise default COS templates for use in the absence of customer-specific COS templates. The staging of COS templates is performed prior to the scheduled delivery/installation day associated with the customer CPE, such as hours (same day COS template generation/association), days or weeks ahead of CPE delivery to customers.

Staging comprises determining configuration and provisioning information associated with both the local CPE environment and the local CPE customer services to be delivered. To do this, the serial number of CPE to be delivered to an individual customer is identified such that the CPE serial number may be associated with that customer. COS templates associated with CPE serial numbers are configured to support the various functions required of the CPE when configured to support respective customer requirements and services.

In various embodiments, the provisioning manager or server 115 considers each such CPE to customer association, as well as the respective COS template, to be one job within a batch of jobs assigned. Each job is stored in a claim table or database by the ZTP server.

A new device claim table is used by the ZTP server to push an initial or bootstrap configuration to the CPE. The initial configuration enables the CPE to find and interact with the ZTP server upon CPE power up at the customer location. The bootstrap configuration may be pushed to the CPE at a time of CPE manufacture, at a time of testing CPEs received from the manufacturer, at a time of testing CPEs prior to deployment or customer delivery, or at an initial CPE power up time (if stored local and available to the CPE, such as within a modem at the customer premises). The initial configuration provides various service attributes such as those for setting up VLAN, PPP, LAN Data/Voice DHCP, COS, QoS, as well as further complex network configurations as discussed herein.

The CPE plug and play utilizes, in one embodiment, FQDN auto-links and DHCP options pre-written and flashed to CPE configurations tables with what is denoted herein as a "Gold Configuration" such as at the point that CPE inventory reaches a distributor. This enables prompt handoff of the CPE within a warehouse environment for CPE pickup or package shipments.

At a customer location, after connection of power and network cabling, the CPE is powered up. At this point, the CPE finds home base (e.g., via FQDN and DHCP-Gateway Options) and, once a live loop is plugged into the CPE Ethernet port, the AG router I redirector sends traffic destined for the service provider's DHCP scope, ZTP domain, hosted within DMZ for secure DHCP IP assignment and authentication to ZTP Server for push of bootstrap template configuration.

Authentication may be performed before or after CPE configuration via the configuration file and interaction with the CDP domain. Once IP authentication of the ZTP agent (CPE/IAD) has initialized through the Transport & AR IP Edge (via VLAN Specific/DMZ tunneling), to DHCP's IP Controller for IP assignments (Utilizing Options 43 & 60—Vendor Specific Identifier); authenticating CPE's entry into the ISP (Internet Service Provider) network, where DNS will direct CPE to ZTP Server's—FQDN residence (zip-cpe.isp.com). Thus enabling a secure registration within our DMZ and ZTP Server's new device claim table, which will then prompt for automatic template push of bootstrap configuration files, firmware updates, as well as any further routing tables or protocols required.

The various embodiments described above generally provide a mechanism in which a standard router, switch or other CPE may be associated with specific "golden configuration file" designed to enable that specific CPE to properly configure itself to its intended customer premises network environment, and properly configure itself to the services appropriate to its intended customer.

In various embodiments, a Fully Qualified Domain Name (FQDN) included within a pre-configuration file is used by the CPE wherever it may be deployed. Based on the FUD and, the Domain Name Server (DNS) note to point to domain name to a specific location. Thus, once the CPE powers up, it knows where it resides within a network. Further, based on the MAC address of the CPE, the network service provider knows the class of services associated with the customer and can push down to the CPE the necessary configuration information as part of the golden configuration file.

Advantageously, these various mechanisms enable a company deploying CPE to test the CPE remotely up to some demarcation point, such as an Ethernet connection a plugs into the CPE. If such testing indicates that the CPE is not functioning or least not reachable, then a new CPE may be shipped to the customer directly rather than sending a technician to diagnose/repair/replace. The customer merely unplugs the old CPE unplugged the new CPE. Configuration processes described herein provisioned the replacement CPE rapidly and correctly.

Similarly, if the MAC address of an old CPE device to be replaced is known, then a "snapshot" of the configuration parameters associated with that CPE device may be captured and used to populate similar configurations of a replacement CPE device. This configuration snapshot may be performed for every CPE device within a system upon successful provisioning/configuration of that device. This information may be stored in a database associated with the provisioning manager or server 115, head end 110 or some other network entity. Thus, prior to shipping replacement CPE out to a customer, the configuration associate of the old CPE is staged as described above with respect to FIG. 2 such that upon the new CPE pairing up, the appropriate configuration information is provided thereto.

Pre-staging of templates with old images of CPE waiting to be called out by new CPE provides improvements in customer service response times while reducing on-site technician calls. CPE images a comprise pre-provisioning information (e.g., default configuration templates), post-provisioning information (e.g., staged configuration templates or COS templates), existing MAC addresses, MAC addresses of CPE to be shipped and so on.

In various embodiments, a replacement CPE may be automatically be updated with configuration and service provisioning information associated with a failed CPE at a customer location. For example, in one embodiment where the MAC address of the new and old CPE is known, the replacement CPE is provided with the configuration and service provisioning information originally generated for the failed CPE at the customer location. Thus, when the replacement CPE is initially powered on at the customer location, if the ZTP server determines that a provisioning request is received from a replacement CPE, the ZTP server will transmit the same service information to the replacement CPE initially generated for use by the failed CPE.

Figure 4:
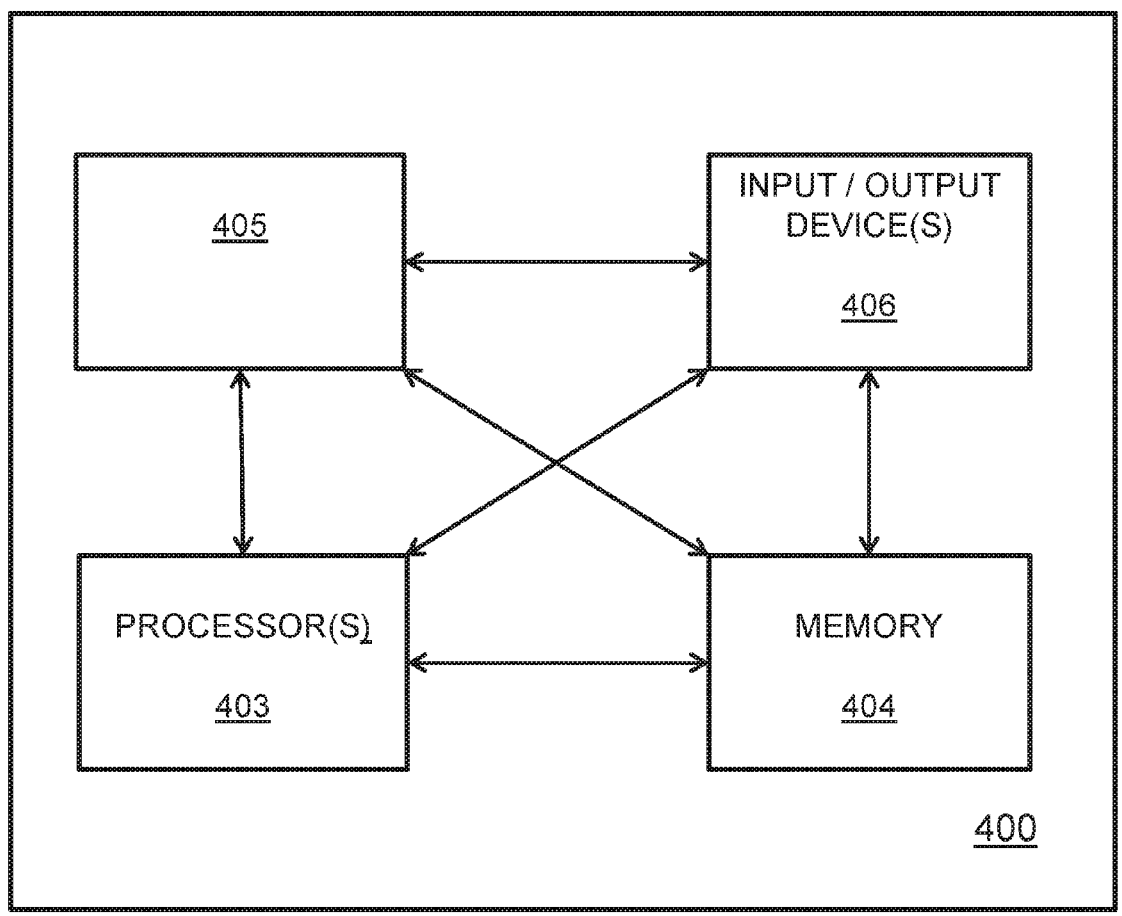
FIG. 4 depicts a high-level block diagram of a computer suitable for use m performing the functions described herein.

FIG. 4 depicts a high-level block diagram of a computing device 400 suitable for use in performing various functions described herein with respect to the disclosed embodiments, such for implementing any device like device IO as described above with respect to the various figures. FIG. 4 is a simplified block diagram of a computing/electronic device that is suitable for practicing the exemplary embodiments of this invention, and a specific manner in which components of the device are configured to cause that device to operate.

As depicted in FIG. 4, computer (computing device) 400 includes a processor element 403 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a solid state drive, a hard disk drive, an optical drive and the like).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 405 can be loaded into memory 404 and executed by processor 402 to implement the functions as discussed herein. Thus, cooperating process 405 (including associated data structures) can be stored on a computer readable storage medium, e.g., RAM memory, magnetic or optical drive or diskette, and the like.

It will be appreciated that computing device 400 depicted in FIG. 4 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device, such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

The various embodiments contemplate an apparatus configured to provide functions as described herein, such as an apparatus comprising a processor and a memory communicatively connected to the processor, the processor configured to perform these functions as described above with respect to the various figures.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims. It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

The invention claimed is:

1. A method, performed by a server computing device for zero touch provisioning (ZTP) in a network, the method comprising:
   receiving, prior to a customer premises equipment (CPE) being plugged into a network link at a specific customer premises for a first time, a customer specification of network requirements (CSNR) exclusively specified for the CPE assigned to a specific customer at the specific customer premises, the CSNR comprising information describing the specific customer premises, and information describing an intended operation to be provided by the CPE for the specific customer;
   provisioning, prior to the CPE being plugged into the network link for the first time, a class of service (COS) template exclusively created for providing the intended operation of the CPE at the specific customer premises, based at least on the CSNR;
   storing, prior to the CPE being plugged into the network link for the first time, the COS template and an identity of the CPE as a job assignment, wherein the identity is unique to the CPE and linked to the specific customer through at least the job assignment;
   receiving, from the CPE, a provisioning request signal sent by the CPE in response to the CPE being plugged into the network link for the first time, the provisioning request signal comprising the identity of the CPE; and
   downloading to the CPE, based at least on the received identity of the CPE matching the job assignment, service information for the ZTP of the intended operation of the CPE, the service information comprising at least the COS template information to configure the CPE for performing the intended operation.

2. The method of claim 1, wherein the identity of the CPE is a serial number.

3. The method of claim 1, wherein the provisioning request signal is received by the ZTP server through a fully qualified domain name (FQDN) of the ZTP server.

4. The method of claim 1, wherein the downloaded service information comprises information related to service attributes of at least one of a point-to-point protocol (PPP), local area network (LAN) data, a quality of service (QoS), dynamic host configuration protocol (DHCP), and virtual local area network (VLAN).

5. The method of claim 1, wherein the CPE is one of a CPE router, a CPE switch, and a voice over internet protocol (VoIP) device.

6. The method of claim 1, wherein the job assignment is stored as an entry in a table comprising a plurality of job assignment entries, each entry comprising information identifying a different CPE of a corresponding plurality of CPEs and a different customer premises of a plurality of customer premises, said table being stored in the ZTP server.

7. The method of claim 1, wherein the class of service (COS) template comprises service configuration layer information.

8. The method of claim 7, wherein the service configuration layer information indicates at least one of a voice quality and a voice session initiation protocol (SIP) trunking.

9. The method of claim 1, wherein a communication path between the ZTP server and the CPE comprises a modem installed in the customer premises.

10. The method of claim 1, wherein the downloading to the CPE of the COS template takes place after authenticating the CPE in the network.

11. The method of claim 1, wherein the CSNR exclusively specified for the CPE at the customer premises is based, at least in part, on a location of the customer premises.

12. The method of claim 11, wherein the CSNR is further based, at least in part, on a network topology associated with the network proximate the location of the customer premises.

13. The method of claim 1, wherein the COS template is provisioned and stored before the CPE sends the provisioning request signal.

14. An apparatus comprising:
   a processor;
   a storage medium for tangibly storing thereon program logic for execution by the processor, the program logic comprising:
   logic for receiving, prior to a customer premises equipment (CPE) being plugged into a network link at a specific customer premises for a first time, a customer specification of network requirements (CSNR) exclusively specified for the CPE assigned to a specific customer at the specific customer premises, the CSNR comprising information describing the specific customer premises, and information describing an intended operation to be provided by the CPE for the specific customer;
   logic for provisioning, prior to the CPE being plugged into the network link for the first time, a class of service (COS) template exclusively created for providing the intended operation of the CPE at the specific customer premises, based at least on the CSNR;
   logic for storing, prior to the CPE being plugged into the network link for the first time, the COS template and an identity of the CPE as a job assignment, wherein the identity is unique to the CPE and linked to the specific customer through at least the job assignment;
   logic for receiving, from the CPE, a provisioning request signal sent by the CPE in response to the CPE being plugged into the network link at the specific customer premises for the first time, the provisioning request signal comprising the identity of the CPE; and
   logic for downloading to the CPE, based at least on the received identity of the CPE matching the job assignment, service information for the ZTP of the intended operation of the CPE, the service information comprising at least the COS template information to configure the CPE for performing the intended operation.

15. The apparatus of claim 14, wherein the downloaded service information comprises information related to service attributes of at least one of a point-to-point protocol (PPP), local area network (LAN) data, a quality of service (QoS), dynamic host configuration protocol (DHCP), and virtual local area network (VLAN).

16. A method, performed by a server computing device for zero touch provisioning (ZTP) in a network, the method comprising:

receiving, prior to a customer premises equipment (CPE) being plugged into a network link at a specific customer premises for a first time, a customer specification of network requirements (CSNR) exclusively specified for the CPE assigned to a specific customer at the specific customer premises, the CSNR comprising information describing the specific customer premises, and information describing an intended operation to be provided by the CPE for the specific customer;

provisioning, prior to the CPE being plugged into the network link for the first time, a class of service (COS) template exclusively created for providing the intended operation of the CPE at the customer premises, based at least on the CSNR;

storing, prior to the CPE being plugged into the network link for the first time, the COS template and an identity of the CPE as a job assignment;

receiving, from the CPE, a provisioning request signal comprising the identity of the CPE; and downloading to the CPE, based at least on the received identity of the CPE matching the job assignment, service information for the zero touch provisioning of the intended operation of the CPE, the service information including at least the COS template information to configure the CPE for performing the intended operation.

17. The method of claim 16, wherein the provisioning request signal is sent by the CPE in response to the CPE being plugged into the network link at the customer premises for the first time.

18. The method of claim 16, wherein the CSNR is based, at least in part, on a topology of the network specific to the customer premises.

19. The method of claim 16, wherein the downloaded service information comprises information related to service attributes of at least one of a point-to-point protocol (PPP), a local area network (LAN) data, a quality of service (QoS), a dynamic host configuration protocol (DHCP), and a virtual local area network (VLAN).

20. The method of claim 16, wherein the class of service (COS) template comprises service configuration layer information indicating at least one of a voice quality and a voice session initiation protocol (SIP) trunking.

\* \* \* \* \*